A. B. FOWLER.
MACHINE FOR GRINDING CURVED TRIMMING BLADES.
APPLICATION FILED AUG. 22, 1919.
1,424,196.
Patented Aug. 1, 1922.
2 SHEETS—SHEET 2.
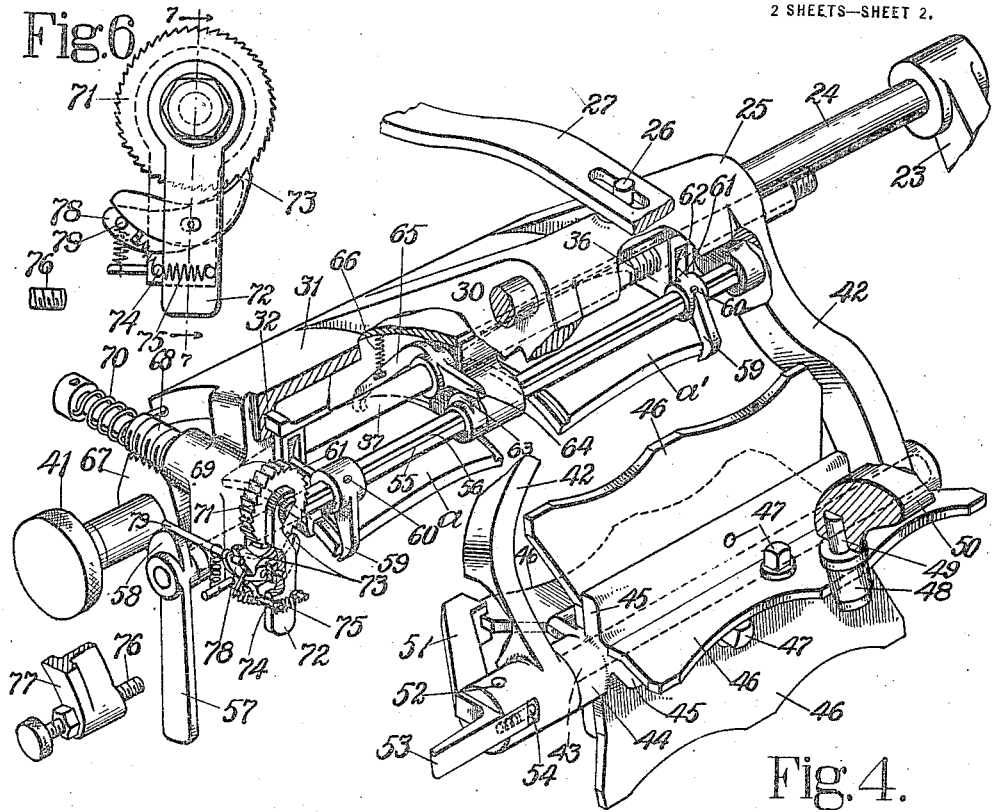
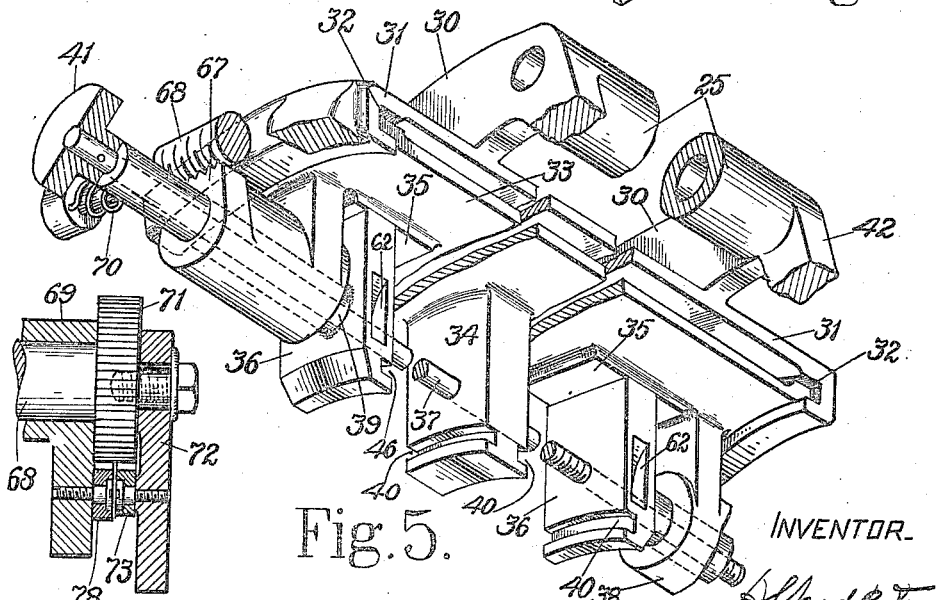
INVENTOR
Alfred B. Fowler
By his Attorney
Nelson N. Howard

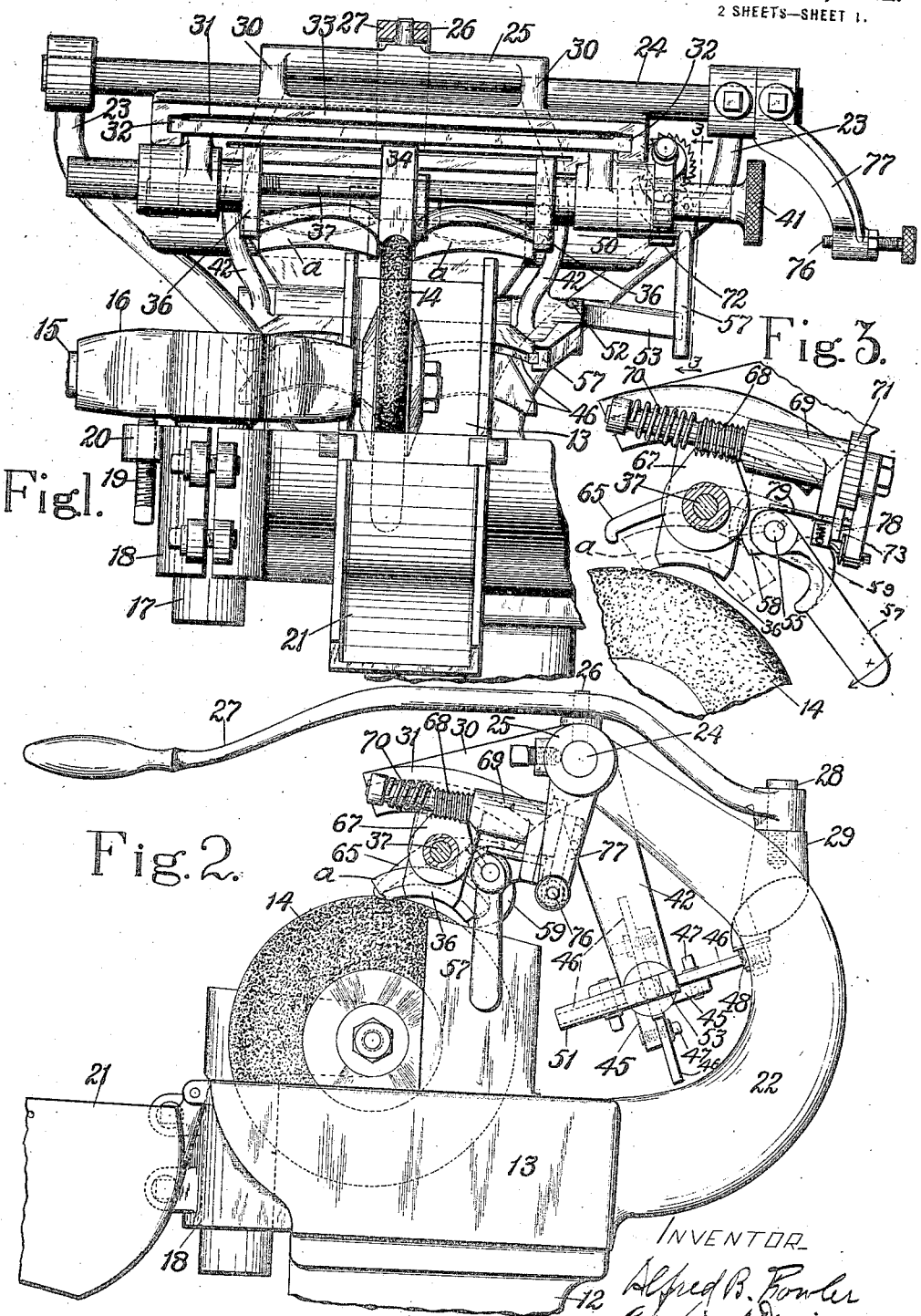

UNITED STATES PATENT OFFICE.

ALFRED B. FOWLER, OF BEVERLY, MASSACHUSETTS, ASSIGNOR TO UNITED SHOE MACHINERY CORPORATION, OF PATERSON, NEW JERSEY, A CORPORATION OF NEW JERSEY.

MACHINE FOR GRINDING CURVED TRIMMING BLADES.

1,424,196.   Specification of Letters Patent.   Patented Aug. 1, 1922.

Application filed August 22, 1919. Serial No. 319,181.

*To all whom it may concern:*

Be it known that I, ALFRED B. FOWLER, a citizen of the United States, residing at Beverly, in the county of Essex and State of Massachusetts, have invented certain Improvements in Machines for Grinding Curved Trimming Blades, of which the following description, in connection with the accompanying drawings, is a specification, like reference characters on the drawings indicating like parts in the several figures.

This invention relates to machines for grinding cutting blades. The invention is illustrated as embodied in a machine especially designed for grinding the companion knives of a rotary cutter head.

For example, a well-known type of heel trimming machine employs a rotary cutter head having two diametrically mounted knives or blades which are curved both laterally and longitudinally as shown, for instance, in Letters Patent No. 543,349 to Noble. Blades of this type are curved rearwardly from their cutting edges, and are irregularly shaped transversely according to the shape of that portion of the heel which is to be trimmed. A blade of such shape is difficult to grind properly for the reason that its transverse form interferes with accurate grinding to present a uniform cutting edge which must, for obvious reasons, be parallel with the outside surface of the blade.

An important object of the invention is to provide a machine capable of accurately grinding a blade of the type referred to so that the entire cutting edge will be in the outside surface of the blade throughout the width thereof, without having the uniformity of said cutting edge interfered with by the curvature of said surface.

In the illustrated construction, the blade to be sharpened is secured in a holder which is traversed across the periphery of a grinding wheel to present all points in the entire edge of the blade to the wheel and, to maintain the proper bevel on the edge of the blade, the blade is given a feeding movement by the holder in a curved path corresponding to the curvature of the blade rearwardly from its cutting edge. As shown, the parts are so organized that the blade can also be rocked during its traversing movement to impart a predetermined shape to the cutting edge and the feeding of the blade in a curved path is accomplished step by step under the control of the traversing movement.

To enable each of two companion blades of a cutter head of such type as illustrated in the patent above mentioned to do its share of trimming work properly, it is essential that the cutting edges of the blades shall be exactly alike. It is obvious that even an expert who is able to grind one such blade with fair accuracy by manual control of the relative movements of the blade and grinder cannot take the companion blade and grind it exactly like the first one. Attempts have been made to produce or sharpen the companion blades of the kind referred to so that they shall accurately correspond by the employment of templet devices which control the movements of a blade past a grinder and toward and from it but so far as I am aware, such machines either necessitate operation first on one blade and then its removal and substitution of the companion blade therefor, or else employ two templets for the two blades. In the first case, there is no certainty that the second blade will be located exactly as the first one was, and in the second case there is liability of the two templets being secured in place somewhat differently so as to result in the two blades not being ground exactly alike.

Another important object of the present invention is to provide a simple machine in which a single controlling means accurately determines the relative movements of a grinder and two companion blades of a rotary cutter head. With this object in view an important feature of the invention comprises a grinding wheel and a carriage, one of which is movable past and toward and from the other, a work holder mounted on the carriage for securing a plurality of blades in edge-to-edge relationship, means to feed the work holder along the carriage toward the grinding wheel, and a controlling means such as a templet mechanism for controlling the shape to be imparted by the grinder to the edges of a plurality of blades.

Another feature of the invention consists in a novel grinding machine having a plurality of rotatably mounted templets for controlling the path of movement of a blade and grinding wheel relatively to each other, means being provided whereby either one of the templets can be rigidly secured in operative position.

These and other features of the invention including certain details of construction and combinations of parts will now be described in connection with the accompanying drawings of an illustrative embodiment of the invention.

Of the drawings,

Fig. 1 is a front elevation of the machine, the manually operable handle being shown in section;

Fig. 2 is an elevation looking from the right of Fig. 1;

Fig. 3 represents a section on line 3—3 of Fig. 1, on a larger scale.

Fig. 4 is a perspective view of parts of the machine, partly broken out, looking from the upper right hand corner of Fig. 1;

Fig. 5 is a broken out perspective view, looking from below, of the work carriage, parts being omitted in the interest of clearness;

Fig. 6 is a detail elevation of a pawl and ratchet control mechanism; and

Fig. 7 represents a section on line 7—7 of Figure 6.

The upper portion of a suitable frame or standard 12 carries a trough 13 above which is mounted a grinding wheel 14 carried by a shaft 15. Said shaft, as best shown in Fig. 1, is mounted in a bearing housing 16 carried by a post 17 mounted in a clamp 18 illustrated as supported at one end of the trough 13. As it is sometimes desirable carefully and accurately to adjust the grinding wheel to compensate for reduction of the diameter of the wheel due to wear, I provide a screw 19 threaded in a lug 20 at one side of the clamp 18 so that, when the clamp 18 is loosened, vertical adjustment of the shaft housing 16 may be effected by means of the screw 19 after which the clamp 18 is again tightened.

A suitable hood for the grinding wheel is indicated at 21, and said hood may be of any well-known or preferred construction.

Rising from the rear of the trough 13 is a frame bracket 22 having arms 23 which are spaced as best shown in Fig. 1 and support a fixed rod 24 which forms a slideway or guide for the work carriage. Mounted on the rod 24 is a carriage slide 25 having a pin 26 entering a slot in a hand lever 27 pivoted at 28 to a stud 29 of the bracket 22.

The carriage slide 25 has forwardly extending arms 30 integrally or otherwise connected with a curved plate 31 which, at each end, is formed or provided with grooved flanges 32 to form ways for the similarly curved work-carrying plate 33. The plate 33 has an integral or otherwise fixed central stud 34 and near each end thereof has bearing faces 35 for the inner ends of blocks or clamp members 36. A rod 37 passes through a bearing 38 projecting from one end of the plate 33 and also through both blocks 36 and the central stud 34, said rod having threaded engagement with one of the blocks 36 and having a collar 39 outside of the other block 36 so that, when the rod 37 is rotated in the proper direction, the space between the blocks 36 will be contracted. The blocks 36 and the central stud 34 are formed with grooves 40 to engage opposite edges of two blades a—a' (Fig. 4). One end of the rod 37 is provided with a head or handle 41 by means of which said rod can be rotated to draw the blocks 36 toward the central member 34 so as to clamp the two blades a, one between one of the blocks 36 and one side of said central stud 34 and the other between the other side of said stud 34 and the other block 36. The rod 37 is free to have sufficient longitudinal movement in the bearings 38 to result in clamping the blades in the manner described, the two blades being held firmly against the central stud 34 which is fixed so far as any lateral movement might be considered and therefore definitely locates the lateral positions of the two blades in the carriage.

Since the carriage, including the slide 25, is permitted to oscillate upon the rod 24 as well as move longitudinally thereof, it will be readily understood that anything which controls oscillatory movements of the carriage during its endwise movements relatively to the grinding wheel will result in imparting a certain contour to the work supported by the carriage, when the said work is in proper proximity to the grinding wheel. I will now describe the templet mechanism which effects this control. Projecting rearwardly and downwardly from the carriage 25 are two arms 42 carrying a pin or shaft 43. Mounted on the pin or shaft 43 is a hub or sleeve 44 having a plurality of radial flanges 45 having shoulders against which the inner edges of templets 46 bear or rest, said templets being secured to the flanges by suitable bolts 47. This structure of templet carrier renders it possible to easily employ different shapes of templets, substituting one for another whenever desired. The outer edge of any one of the templets 46 acts to control the work by co-operating with a roll 48 mounted on a pin 49 carried by a bar 50 extending transversely between the arms 23 of the frame bracket 22. As will be readily understood from Fig. 2, the weight of the parts is such that there is a normal tendency of the work carriage and the arms 42 thereof to swing toward the right from the position shown in said figure so that, as the carriage is shifted along the rod 24 by the operator's manipulation of the handle 27, the entire carriage will be rocked to swing the work relatively to the axis of the grinding wheel, due to the bearing of the edge of a templet 46 against the roll 48. The guide surface of each templet is made sufficiently long to extend across the cutting edges of both blades so that one complete traverse of the carriage results in the shaping of two blades.

Suitable means are provided for holding the selected templet in position, the means illustrated comprising a detent 51 (Fig. 4) pivoted at 52 to an enlargement of one of the arms 42 and having a finger piece 53, said detent having a spring stud 54 bearing against the bottom of the recess in which the detent is mounted so as to have a normal tendency to hold the detent 51 in the position best shown in Fig. 1. Whenever it is desired to bring a new radially mounted templet into position to co-operate with roll 48, the operator presses against the finger piece 53 to swing the detent 51 outwardly so as to release the templet with which the yoke-shaped end of the detent was engaged, after which the hub or sleeve 44 is rotated to bring the desired templet into position to co-act with roll 48 and then the detent is released to engage the said templet the end of which has been brought opposite said detent by rotative adjustment of the sleeve. Re-engagement of the yoke-shaped end of the detent with a templet locks the entire series.

As best shown in Fig. 4 the body of the carriage comprises the slide 25, the curved plate 31 and the arms 42. A rod or shaft 55 having a keyway 56 and a handle 57 is mounted in suitable bearings in the carriage so that it can be rocked. The handle 57 has a cam 58 the purpose of which will be presently described.

Mounted on the rod 55 are two fingers 59 having hook-shaped ends, the hubs of said fingers having suitable keys such as screws 60 the inner ends of which engage the keyway 56. Projecting from the hubs of the fingers are tongues 61 entering recesses 62 in the work clamp members 36 (Figs. 4 and 5), the engagement of said tongues and recesses ensuring that whenever the clamp members 36 are shifted relatively to the central stud 34, the fingers 59 will correspondingly move so as to always be in position to engage predetermined lateral portions of the rear edges of the blades $a, a'$ as will be hereinafter described.

Secured to the rock shaft 55 adjacent a bearing portion which projects from the central stud 34 is a cam 63 to act upon the arm or tail piece 64 of a finger 65 the hub of which is rotatably mounted on the rod 37. A suitably connected spring 66 causes the finger 65 to rise when permitted to do so by the cam 63.

A portion of one of the bearings 38 is extended, as best shown in Fig. 5, and has an upwardly projecting web the upper surface of which is toothed to form a somewhat segmental rack 67, the curvature of the rack teeth 67 corresponding with the radius of curvature of the ways 32 and clamp carrying plate 33. Engaging the rack 67 is a worm 68 mounted in bearings 69 (Figs. 2 and 4) which may be integral with the curved plate 31. A spring 70 has one end connected to a collar at the end of the worm, said spring having its other end connected to the plate 31, the action of this spring being, as hereinafter explained, to return the worm 68 to normal position after said worm has been rotated to effect a feeding operation which will be explained. Secured to the other end of the worm 68 is a ratchet 71 (Figs. 3, 4, 6 and 7) and hung upon a reduced end portion of the worm, close to the ratchet 71 is an arm 72 carrying a ratchet actuating pawl 73. A stop pin 74 limits the movement of the arm 72 in one direction, and a spring 75 is connected to said stop pin and to the arm 72 to normally hold the latter in the position shown in Fig. 6.

When the carriage is shifted toward the right in Fig. 1, by means of the hand lever 27, the arm 72 contacts with the inner end of a screw 76 carried by a fixed arm 77 secured to one end of the rod or slideway 24, the contact of the arm 72 with said pin 76 causing the pawl 73 to impart a step of rotation to the ratchet 71 and the worm 68. A detent pawl 78 is pivotally supported by the lower portion of bearing bracket 69 and has a pin 79 extending over the cam 58. The outer end of pin 79 extends across the heel of the actuating pawl 73 (Figs. 3, 4 and 6). Suitable springs are provided to hold the pawls 73 and 78 in position to cause their tips to engage the ratchet so that pawl 73 may actuate the ratchet and the pawl 78 prevent return movement.

In operation, assuming that no blades are in place to be ground, and that the handle 57 is in the position shown in Fig. 3, the fingers 59, 65 will be in the positions shown in that figure. This is because the rock rod 55 swings the fingers 59 rearwardly and the cam 63 occupies such position that the spring 66 (Fig. 4) holds the front finger 65 raised. At this time it is also to be assumed that the rod 37 has been actuated to provide for such spreading apart of the two clamp members 36 as to leave space between the said members 36 and the central member 34 to permit of the introduction of two blades $a, a'$ into the grooves 40. Before the blades are clamped edgewise by contraction of the members 36 toward each other, the rock rod 55 is actuated by its handle 57 in the direction of the arrow $x$ in Fig. 3, and this results in swinging the fingers 59, 65, toward the position indicated in Fig. 2. The result of this movement is that the one finger 65 shown in Fig. 4 moves to position in time so that its hooked tip will serve as a stop to limit the forward position to which the blade $a$ can be shifted or pushed by the finger 59 which is shown at the left in Fig. 4. This determines the proper forward position to be occupied by blade $a$ at the beginning of the grinding operation. The reason why there is no front stopping or limiting finger for the other blade $a'$ is that since the two fingers 59 are carried by the one rock rod 55, said two fingers 59 will act to push both blades forward in the guides 40 so as to locate their rear edges in the same plane. Consequently if the two blades $a$, $a'$ are of the same length from front to rear the front or cutting edges of both will be determined by the one forward finger 65. If the blade $a'$ in Fig. 4 is longer than blade $a$ its front edge will, of course, project nearer the grinding wheel than the front edge of blade $a$, and then grinding action will be had only upon the front edge of blade $a'$ until its length from front to rear has been reduced to the same length as blade $a$. On the other hand, if blade $a'$ is shorter than blade $a$, grinding will be effected only on blade $a$ until its length is reduced to that of blade $a'$. The final result will be the production of two blades uniform as to length.

After the blades $a$, $a'$ have been properly located by means of the fingers 59, 65, as just described, the handle 57 is swung back to the position shown in Fig. 3, so that the fingers then rise to normal position where they will not interfere with further operations. Then the clamp rod 37 is actuated to cause the clamp members 36 to approach the central member 34, whereby the blades will be held firmly in edgewise relationship ready for the grinding operation.

The operator, by means of the handle 27, shifts the carriage back and forth along the slideway 24, the edges of the two blades being carried past and in contact with the periphery of the grinding wheel, the carriage oscillating or swinging as it is so traversed, the degree of the oscillations being controlled by the coaction of one of the templets 46 with the roll 48.

Each time that the operator traverses the carriage toward the right in Fig. 1, he moves it until arrested by the arm 72 coming in contact with the screw 76 (Figs. 1 and 4). This contact is sufficient to swing the arm 72 slightly but far enough to cause the pawl 72 to act on the ratchet 71 to impart a slight rotation to the worm 68. Said worm, by acting on the rack 67 of the bearing 38, causes a slight forward movement of the curved plate 33 in the grooves 32 of the plate 31. Since the plate 33 carries the work clamps, the two blades are thus fed slightly so that upon the next traverse of the blades past the grinding wheel there will be a slight further operation of the wheel upon the front edges of the blades. Usually there will be several traverses of the carriage before grinding is completed, and for every such traverse there is a slight forward feed or advance of the blades toward the grinding wheel in a curved path corresponding to the curve of the blades. Consequently the bevel of the front edges of the blades will not be altered by the gradual feed and the cutting edges of both blades will always be in the outside surfaces thereof. Each step rotation of the worm 68 acts to slightly wind up the spring 70.

When grinding has proceeded far enough, the operator swings the handle 57 downward to the position shown in Figs. 2 and 4, far enough to cause the cam 58 to engage pin 79 and lift it. As said pin is mounted in the detent pawl 78 and extends past the actuating pawl 73, the lifting of said pin 79 disengages both of the pawls from the ratchet which immediately then rotates backwardly under the influence of the power which has been stored in spring 70. The consequent rotation of worm 68 acts, through rack 67, to return the curved feed plate 33 to normal position, after which the ground blades are removed and new ones may be inserted and the operation repeated as described.

While the invention has been especially designed with reference to the production of two blades ground exactly alike, I do not limit myself to such use of the machine. Sometimes it may be desired to grind but a single glade. In such case only one blade will be fitted in the position of blade $a$ in Fig. 4. The operation will be the same as hereinbefore described except that the user will then, by means of the handle 27, traverse the carriage through only approximately ½ of the distance provided for on slideway 24.

Having described my invention, what I claim as new and desire to secure by Letters Patent of the United States is:

1. A machine for grinding trimming blades, having, in combination, a grinding wheel, a carriage, a fixed guideway, means for causing movement of the carriage along the guideway to grind the entire edge of the blade, means to rock the carriage to impart predetermined shape to the blade, and means for feeding the blade edgewise on the carriage toward the wheel.

2. A machine for grinding trimming blades, having, in combination, a grinding element, a slideway, a carriage mounted to slide and rock on said slideway, mechanism for controlling rocking movement of the carriage, and means to feed the blade edgewise along the carriage toward the grinding element.

3. A machine for grinding trimming blades, having, in combination, a grinding wheel, a carriage movable past the grinding wheel, means to rock the carriage in its movement past the wheel, and means responsive to the movement of the carriage for feeding the work on said carriage toward the grinding wheel.

4. A machine for grinding curved trimming blades having, in combination, a grinding wheel and a work carriage one of which is movable relatively to the other longitudinally of the axis of the wheel, a blade holder mounted in said carriage, means for feeding the holder in a curved path corresponding to the curvature of the blade rearwardly from its cutting edge, and means for varying the distance between the holder and wheel during traverse longitudinally of the axis of the wheel to impart a predetermined shape to the blade.

5. A machine for grinding curved trimming blades having, in combination, a grinding wheel and a work carriage one of which is movable relatively to the other longitudinally of the axis of the wheel, a blade holder mounted in said carriage, means for feeding the holder step by step in a curved path corresponding to the curvature of the blade rearwardly from its cutting edge, and means for varying the distance between the holder and wheel during traverse in the direction of the axis of the wheel, said distance varying mechanism including a templet and a coacting abutment therefor one of which is connected to the carriage.

6. A machine of the character described having, in combination, a grinding wheel and a carriage one of which is movable past and toward and from the other, a work holder mounted on the carriage for securing a plurality of blades in edge-to-edge relationship, means to feed the work holder along the carriage toward the grinding wheel, and a single controlling mechanism for determining the shape to be imparted by the wheel to the plurality of blades.

7. In a machine of the character described, a grinding wheel, a guide rod parallel with the axis of said wheel, a carriage mounted to slide and rock on said guide rod, templet mechanism for controlling rocking movements of the carriage, means for feeding the work along the carriage toward the wheel, and a manually operable lever for shifting the carriage along the guide rod.

8. In a machine of the character described, a grinding wheel, a carriage mounted to move past the wheel, said carriage having curved ways, a plate mounted in said ways, a central stud carried by said plate, blocks slidably mounted on opposite sides of said central stud, the said stud and blocks having grooves for engaging opposite edges of blades to be ground, and means for actuating the blocks toward the central stud to clamp blades in said grooves.

9. In a machine of the character described, a grinding wheel, a carriage mounted to move past the wheel, said carriage having curved ways, a plate mounted in said ways, a central stud carried by said plate, blocks slidably mounted on opposite sides of said central stud, the said stud and blocks having grooves for engaging opposite edges of blades to be ground, and means for actuating the blocks toward the central stud to clamp blades in said grooves, means being provided for automatically feeding the clamp carrying plate in a direction toward the grinding wheel.

10. In a machine of the character described, a grinding wheel, a carriage mounted to move past the wheel, said carriage being constructed and arranged to oscillate relatively to the wheel, said carriage having curved ways, a work carrier mounted in said ways, means for automatically feeding the work carrier in the direction controlled by said ways, and templet mechanism for controlling oscillations of the carriage.

11. A machine of the character described having, in combination, a grinding wheel and a work holder one of which is movable past and toward and from the other, a templet-carrying shaft and an abutment one of which is connected with the work holder and the other with a stationary part of the machine, a rotatable hub having a plurality of templets rigidly secured thereto, and means for securing said hub in different angular positions to present either one of its templets to the co-operating abutment.

12. A machine of the character described having, in combination, a grinding wheel and a work holder one of which is movable past and toward and from the other, a rotatably adjustable hub carried by the work holder and having a plurality of radially extending templets rigidly secured thereto, and a stationary abutment to co-operate with either one of said templets.

13. In a machine of the character described, a grinding wheel, a work carriage mounted to move past and toward and from the wheel, a rotatably mounted hub having a plurality of templets and being carried by the carriage, means for securing the hub rigidly in different angular positions to bring any desired templet to working position, and an abutment for one of said templets.

14. In a machine of the character described, a grinding wheel, a work carriage mounted to move past and toward and from the wheel, a pair of arms extending from said carriage, a hub rotatably supported by said arms and having a plurality of radial flanges, templets secured to said flanges, and an abutment for one of said templets.

15. In a machine of the character described, a grinding wheel, a work carriage mounted to move past and toward and from the wheel, a pair of arms extending from said carriage, a hub rotatably supported by said arms and having a plurality of radial flanges, templets secured to said flanges, a detent for engaging one of the templets to lock them in rotatably adjusted position and an abutment for one of the templets.

16. In a machine of the character described, a grinding wheel, a fixed guide extending past the wheel, a slide mounted on said guide and having ways at a right angle to the guide, means for rocking said slide on the fixed guide, a work clamp mounted in said ways, and means for automatically shifting the work clamp in the ways toward the grinding wheel.

17. In a machine of the character described, a grinding wheel, a carriage mounted to slide past the wheel, said carriage having a pair of clamps for holding two blades in edgewise alinement, and a rock rod mounted in the carriage and having two fingers for engaging the rear edges of the blades to adjust them in the clamps.

18. In a machine of the character described, a grinding wheel, a carriage mounted to slide past the wheel, said carriage having a pair of clamps for holding two blades in edgewise alinement, a rock rod mounted in the carriage and having two fingers for engaging the rear edges of the blades to adjust them in the clamps, and a movable finger to engage the front edge of one of the blades to limit the forward position of adjustment thereof.

19. In a machine of the character described, a grinding wheel, a carriage mounted to slide past the wheel, said carriage having a pair of clamps for holding two blades in edgewise alinement, a rock rod mounted in the carriage and having a longitudinal key-way, a pair of fingers mounted on the rod and having portions engaging said key-way, and connections between the fingers and clamps to shift the fingers along the rod when the clamps are adjusted.

20. In a machine of the character described, a grinding wheel, a carriage mounted to slide past the wheel, said carriage having a pair of clamps for holding two blades in edgewise alinement, a rock rod mounted in the carriage and having a longitudinal key-way, a pair of fingers mounted on the rod and having portions engaging said key-way, and connections between the fingers and clamps to shift the fingers along the rod when the clamps are adjusted, said connections comprising tongues carried by the fingers and tongue-receiving recesses in the clamps.

21. In a machine of the character described, a grinding wheel, a carriage mounted to slide past the wheel, said carriage having a pair of clamps for holding two blades in edgewise alinement, a rock rod mounted in the carriage and having a cam, fingers carried by said rod for engaging the rear edges of the blades to adjust them in the clamps, and a pivotally mounted finger to limit the forward adjusted position of one of the blades, said finger having an arm bearing on the cam of the rock rod.

22. In a machine of the character described, a grinding wheel, a carriage mounted to move past the wheel, said carriage having curved ways, a work carrier mounted in said ways, and means for automatically feeding the work carrier in the direction controlled by said ways, said feeding means comprising a toothed segment carried by the work carrier, a worm engaging said segment, and means for actuating the worm when the carriage is shifted.

23. In a machine of the character described, a grinding wheel, a curved plate mounted to slide past the wheel and having its ends provided with transverse ways, a clamp carrying plate mounted in said ways and having a toothed segment, a worm carried by the slide plate and engaging the segment, and means for imparting intermittent rotations to the worm to feed the clamp carrying plate toward the grinding wheel.

24. In a machine of the character described, a grinding wheel, a curved plate mounted to slide past the wheel and having its ends provided with transverse ways, a clamp carrying plate mounted in said ways and having a toothed segment, a worm carried by the slide plate and engaging the segment, a ratchet carried by the worm, an arm having a pawl engaging the ratchet, and an abutment in the path of movement of said arm to effect a slight rotation of the worm to feed the clamp carrying plate each time the arm contacts with said abutment.

25. In a machine of the character described, a grinding wheel, a carriage having work clamps mounted to slide past the wheel, means for automatically feeding the work clamps transversely of the carriage toward the wheel, a rock rod having a handle and a cam and work engaging fingers, and means engaged by the cam of the rock rod to render the feeding means inoperative when the said fingers are engaged with the work.

In testimony whereof I have signed my name to this specification.

ALFRED B. FOWLER.